United States Patent [19]
Hodgson

[11] 4,095,617
[45] Jun. 20, 1978

[54] CONTROL VALVES

[75] Inventor: Robert F. Hodgson, Youngstown, Ohio

[73] Assignee: Commercial Shearing, Inc., Youngstown, Ohio

[21] Appl. No.: 802,248

[22] Filed: May 31, 1977

Related U.S. Application Data

[63] Continuation-in-part of Ser. No. 683,956, May 6, 1976, abandoned.

[51] Int. Cl.² ............................................. F15B 13/02
[52] U.S. Cl. ................................ 137/596.13; 137/860
[58] Field of Search ............. 137/117, 596.12, 596.13, 137/860, 516.15

[56] References Cited

U.S. PATENT DOCUMENTS

| 2,671,466 | 3/1954 | Conrad | 137/860 X |
| 3,565,110 | 2/1971 | Hodgson | 137/596.12 |
| 3,707,988 | 1/1973 | Hodgson | 137/596.12 |
| 3,782,404 | 1/1974 | Hodgson | 137/117 X |

Primary Examiner—Alan Cohan
Assistant Examiner—Gerald A. Michalsky
Attorney, Agent, or Firm—Buell, Blenko & Ziesenheim

[57] ABSTRACT

A pressure compensated directional control valve is provided which automatically regulates the position of the valve depending upon the load so as to maintain a constant flow of fluid by means of check valve members in the spool in the form of a resilient or flexible band in a groove surrounding the valve spool and covering the outer ends of the radial passages from the internal spool chambers.

5 Claims, 7 Drawing Figures

4,095,617

CONTROL VALVES

This application is a continuation-in-part of my copending application Ser. No. 683,956, filed May 6, 1976, now abandoned.

This invention relates to control valves and particularly to pressure compensated control valves for fluid actuated systems and is an improvement on the control valve structure disclosed and claimed in my U.S. Pat. Nos. 3,707,988 and 3,565,110.

It has long been recognized that it is desirable for the rate of movement of a load-moving mechanism be the same regardless of the amount of the load. In fluid actuated systems, this means that the volume of fluid flowing in the system must be the same regardless of load size. This can, of course, be regulated manually to some degree by moving the valve manually to adapt it to varying conditions of load. The manual control is, however, quite difficult and requires a highly skilled operator and constant attention by him.

The present invention provides a valve structure which automatically regulates the position of the valve depending upon the load so as to maintain a constant volume flow of fluid, just as was the case in the structure of each of U.S. Pat. Nos. 3,707,988 and 3,565,110.

Both of these patents provide ball check valves on each side of the center of the spool and on the axis or center line of the spool. This requires that the spool be provided with some stop or retainer mechanism for holding the balls in place in the valve spool.

In the present invention I provide a check valve in the form of a resilient or flexible band in a groove surrounding the valve spool and covering the outer ends of the radial passages from the internal spool chambers.

In the present invention there is provided a directional control valve for selectively operating a fluid motor at a controlled speed, said valve having inlet and outlet ports and first and second motor ports for connection to opposite sides of said fluid motor, a pressure compensating valve having an axial bore, an inlet port connected to the inlet port of said control valve, an outlet port, a pressure sensing port, a valve member movable in said axial bore, means biasing said valve member to a position normally blocking said outlet port from said inlet port and partially blocking said inlet port from the inlet port of the control valve, said valve member having opposite surfaces thereon exposed to respectively the fluid pressure at said inlet port and to fluid pressure at said pressure sensing port acting with said biasing means, said valve member in the pressure compensating valve being movable in response to a fluid pressure differential between its inlet port and pressure sensing port through the directional control valve to connect said inlet port to said return port for by-passing input pressure fluid from said directional control valve to thereby regulate the input flow through said directional control valve means to one of said work ports. Preferably the directional control valve is provided with a spool movable in a bore therein, said spool being hollow at each end to form chambers therein adapted selectively to communicate through the spool walls with the inlet port, work ports and outlet port and through cooperating grooves in the directional control valve bore and the directional control valve spool and the pressure sensing port of the pressure compensating valve. The chambers in each end of the directional control valve spool may be provided with check valves or compensator check valves between the work ports and the inlet or exhaust ports along with the band or flexible checks on the radial sensing passages of the spool. Preferably the band checks and grooves are arranged in the spool so that the bands are never completely open to a chamber in the valve housing and can never be dislodged and jam the valve.

In the foregoing general description, I have set out certain objects, purposes and advantages of my invention. Other objects, purposes and advantages will be apparent from a consideration of the following description and the accompanying drawings in which.

Figure 2:
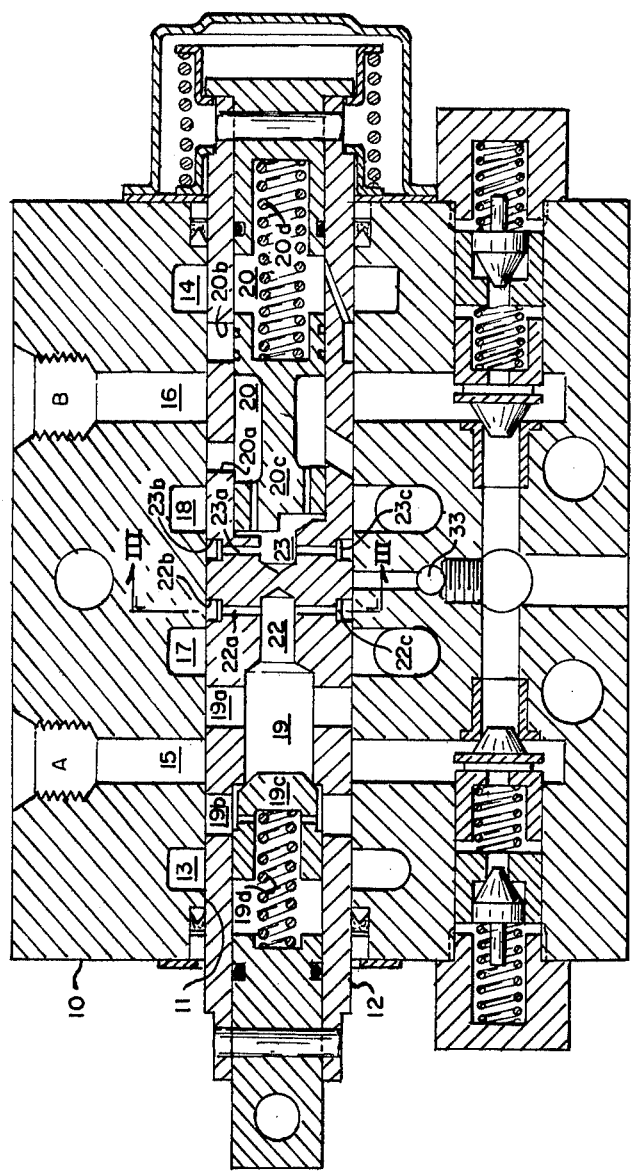
FIG. 2 is a section on the line II—II of FIG. 1.

Referring to the drawings, I have illustrated a directional control valve housing 10 having an axial bore 11 carrying a valve spool 12. The housing is provided with spaced exhaust chambers 13 and 14 adjacent each end and intersecting bore 11, a pair of work chambers 15 and 16, one adjacent each exhaust chamber and each adapted to be connected to the opposite sides of a fluid motor. Between the two work chambers are spaced inlet chambers 17 and 18. The valve member 12 is hollow at each end to provide a pair of spaced internal chambers 19 and 20 extending axially of the valve member and each connected to an axial sensing chamber 22 and 23 respectively. Each of chambers 22 and 23 is provided with passages 22a and 23a extending radially to the periphery of the valve member. The chamber 20 is provided with two sets of radial openings 20a and 20b and chamber 19 is provided with a corresponding set of radial openings 19a and 19b. The openings 19a and 20a lie on a helical line so that their center lines are not on the same circumferential line. Openings 19b and 20b are separated from openings 19a and 20a respectively by check valves 19c and 20c within the respective chambers operated by springs 19d and 20d. A pair of annular grooves 22b and 23b surround the valve member in communication with passages 22a and 23a of the directional control valve member. Annular flexible spring check valves 22c and 23c fit within grooves 22b and 23b and are held against rotation by a radially extending finger 21e inserted on hole 21a. When the valve is shifted to the right viewing FIG. 2 the openings 20a are one after another opened to work chamber 16 while openings 20b are open to outlet or exhaust chambers 14. At the same time, openings 19a are opened to inlet chamber 17 and openings 19b are opened to work chamber 15. As the valve is moved the openings 19a and 20a are opened to the appropriate chamber one after another to provide slowly increased flow of fluid into the corresponding chamber in a throttling manner. This fluid then opens the corresponding check valve 19c permitting fluid in chamber 19 to flow to work chamber 15 and thence to one side of a fluid motor (not shown). In turn, the fluid in the opposite side of the fluid motor is discharged to work chamber 16 thence through openings 20a, check valve 20c and into outlet chamber 14. At the same time the pressure in chamber 19 passes through the opposite direction from chamber 22, passages 22a and annular spring check 22c into parallel sensing passage 33.

Figure 4:
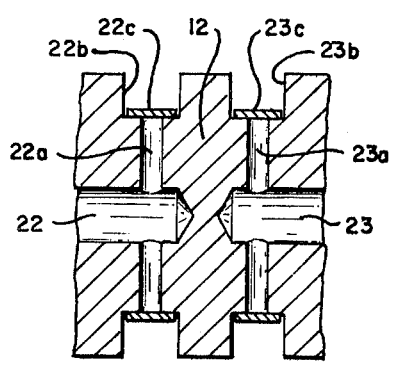
FIG. 4 is a section on the line IV—IV of FIG. 3.
Figure 3:
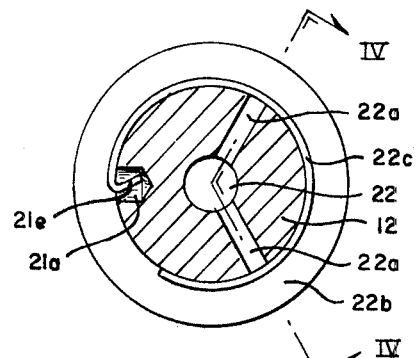
FIG. 3 is a fragmentary section on the line III—III of FIG. 2.
Figure 5:
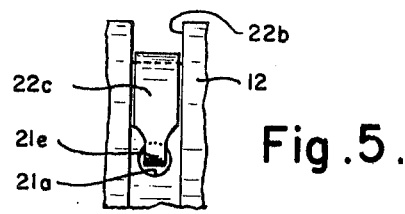
FIG. 5 is a fragmentary elevation from the left of FIG. 3.

The pressure compensating valve is essentially the same as that shown in my U.S. Pat. Nos. 3,707,988 and 3,565,110 and includes a housing 40 which has a bore 41 closed at one end by a cap 42 threaded into the bore at one end and by a cap 43 threaded into the bore at the opposite end. The bore 41 is intersected by outlet or exhaust chambers 44 and 45 at each end connected together by a U-shaped passage 46. Inlet or high pressure chambers 47 and 48 intersect the bore intermediate the outlet chambers. A pressure sensing passage 49 intersects the bore 41 between the inlet chambers 47 and 48. The cap 43 extends through the exhaust or outlet chamber 45 and is provided with a groove 43a which permits free movement of fluid around it in chamber 45. A valve member 50 is freely movable in bore 41 and is biased toward cap 42 by spring 51 which bears on cap 43 at one end and on the valve member 50 with the other. The valve member is hollow from the end adjacent cap 42 to a point spaced from its opposite end to form an inner axial chamber 52. Radial openings 53 spaced axially along and through the wall of the valve member 50 connect the chamber 52 with inlet chamber 48. Similar radial openings 54 spaced axially along and through the wall of valve member 50 connect the chamber 52 with inlet chamber 47. An annular groove 55 surrounds the valve member 50 in communication with passage 49. Groove 55 is connected to the area between cap 43 and valve member 50 by an axially extending passage 56 which parallels the chamber 52. Outlet section 60 is the same as that shown in FIG. 4 of my U.S. Pat. Nos. 3,707,988 and 3,565,110 and as in those patents is provided with outlet chambers 65 and 73. Outlet chambers 65 and 73 are connected by U-shaped passage 74. Passage 75 extends from port 76 to outlet passage 73.

Figure 1:
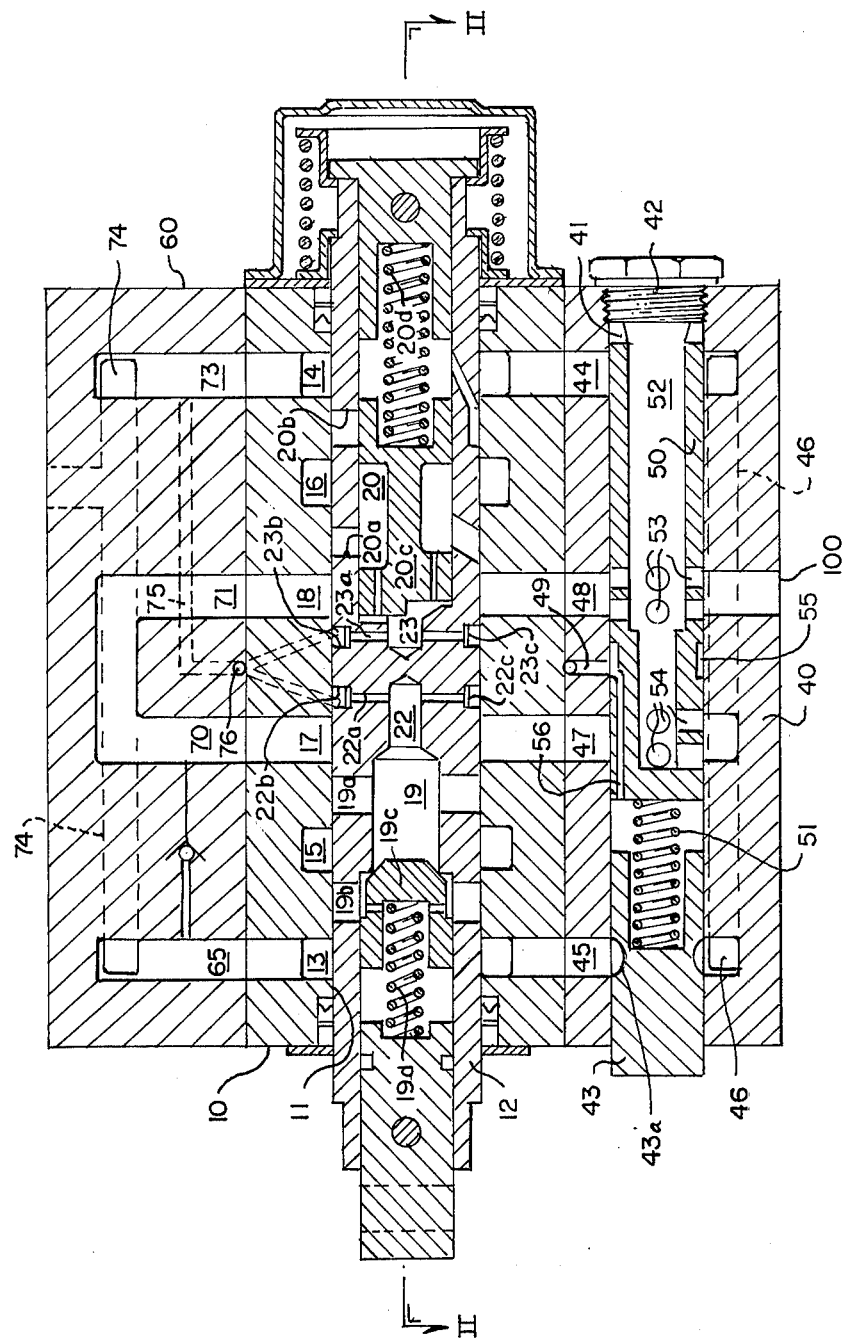
FIG. 1 is a schematic section through a directional control valve and pressure compensating valve according to my invention.

The operation of the valve structure of this invention is as follows. Referring to FIG. 1, I have shown the assembly of directional control valve 10, inlet pressure compensating valve 40 and outlet section 60 in their position with no fluid pressure applied. When fluid pressure is applied to input port 100 from a pump (not shown) the chambers 48, 18, 71, 70, 17 and 47 are pressurized along with the interior chamber 52 of valve element 50. The pressure with chamber 52 causes the valve 50 to shift to the left viewing FIG. 1 to discharge out of the open end of chamber 52 into chamber 44 and thence through chambers 14 and 73 to the outlet and back to tank (not shown). When the control valve spool 12 is shifted, as for example to the right viewing FIG. 1, the input fluid passes through openings 19a into chamber 19, past check valve 19c, through openings 19b into work chamber 15 and thence to one side of a fluid motor to be operated. The position of valve spool member 12 in bore 11 controls the amount of volume initially by the amount and number of openings 19a opened to chamber 17. In short, the position of the spool and openings 19a establish an equivalent orifice whether there is flow or not. This establishes substantially the same stable pressure in 19 and at the spring end of valve 50 as exists at inlet port 100 and in 52. Valve 50 is therefore biased to the right by spring 51 to begin shutting off the flow to 44. Return fluid from the work chamber 16 enters openings 20a, past check valve 20c and exhausts through openings 20b to exhaust or outlet chamber 14. At the same time passage 22a comes into communication with passage 49 through passage 33 and check ring 22c as the valve member is moved to the right so that the area behind valve 50 in which spring 51 operates is pressurized at the same pressure as chamber 19 in valve 12. If the pressure increases then valve member 50 moves to the right cutting off the amount of fluid dumping through the valve end to chamber 44 increasing the pressure of input fluid in chamber 17 to maintain a constant flow through work chamber 15. If, on the other hand, the pressure drops in chamber 19 then the pressure behind valve 50 drops and the valve moves leftward increasing the amount being bypassed to chamber 44. In short, once the control valve 12 is set for a given volume, the change in pressure drop controls the amount of fluid being dumped in valve 40 so that the amount of fluid going to the work port is constant. When the control valve 12 is completely opened, that is, at its left or right extreme 100 percent of the oil goes to the work port and the valve 50 is in its extreme right position with no oil being bypassed.

An appropriate leakage path is provided from the chamber to the left of valve 52 carrying spring 51, which in the present case is in the clearance of the valves 22c and 23c but may be a bleed line in cap 43 to chamber 45 or any similar obvious means for discharging the fluid behind valve 52.

The structure here is substantially different from that of my earlier U.S. Pat. No. 3,707,988 in that the compensator signal check valves within the spool, on each side of the spool and on the center line of the spool have been removed. The check valves in the present structure are the flexible spring rings 22c within the annular grooves 22b surrounding the spool 12. This permits oil to flow from inside the spool to the communicating passage 33 and on to the compensator in the inlet. The communicating passage 33 is a continuous passage through each valve of a multi-valve assembly and connects each spool with the inlet, essentially putting everything in parallel.

The check valve 22c preferably consists of a flexible metal band around the groove 22b covering the radial holes or passages 22a. The tension on the band is such that pressure from chamber 22 will lift the band 22c and permit oil to flow around the edges and into the communicating passage 33 where the spool is in work position shifted to the right, viewing FIG. 1. Reduced pressure within chamber 22 relative to that in passage 33 or in any other passage with which it communicates will tend to close the flexible band down onto the holes 22a and seal them so that no backflow from outside the spool into the spool interior occurs.

In the operation of the valve described above with the spool removed to the right port 15 would be the pressure port and port 16 the exhausting port. The signal to the compensator would go from chamber 22, through radial passages 22a, around the flexible band check 22c to passage 33. At the same time port 16 would be exhausting to the reservoir or exhaust passage 14 at the far right of the valve body, and its check valve 23c would be communicating with the supply chamber 18 so that a maximum pressure differential would hold band 23c tightly in closed position.

Figure 7:
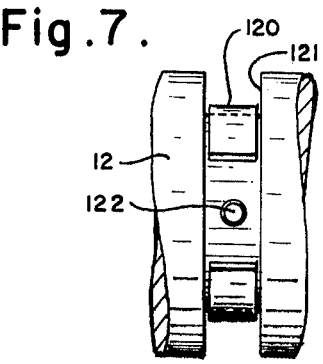
FIG. 7 is a fragmentary elevational view from the left of FIG. 6.
Figure 6:
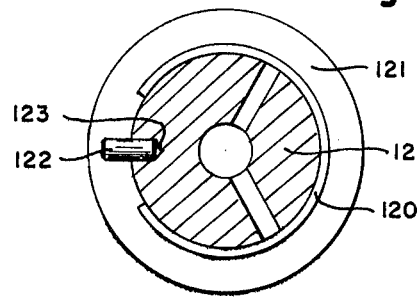
FIG. 6 is a sectional view of a second embodiment of directional control valve member embodying a port compensator check.

In FIGS. 6 and 7 I have illustrated a valve according to this invention in which annular flexible check valves 120 fit within grooves 121 in spool 12 and are held against displacement by a pin 122 in opening 123 in spool 12.

While I have illustrated and described certain presently preferred embodiments of this invention in this foregoing specification, it will be understood that this invention may be otherwise embodied within the scope of the following claims.

I claim:

1. A pressure compensated directional control valve comprising a directional control valve for selectively operating a fluid motor at controlled speed, said valve having inlet and outlet ports and first and second motor ports for connection to opposite sides of a fluid motor, a longitudinal bore in said control valve, a valve spool movable in said bore, said valve spool being hollow at each end forming spaced chambers selectively communicating through the valve spool walls with the inlet ports, outlet ports and work ports and with a pair of spaced grooves surrounding the valve spool, flexible annular band check means surrounding each groove, a pressure sensing port communicating selectively with each groove in the spool, a pressure compensating valve having an axial bore, an inlet port connected to the inlet port of said control valve, an outlet port connected to the outlet port of said control valve, a pressure sensing port communicating with the pressure sensing port of the directional control valve, a valve member movable in said axial bore, means biasing said valve member to a position normally blocking said outlet from said inlet port, said valve member having opposite surfaces thereon exposed respectively to fluid pressure from said inlet port and to fluid pressure at said pressure sensing port acting with said biasing means, said valve member being movable in response to fluid pressure differential between its inlet port and pressure sensing port through the pressure sensing port of the directional control valve to connect said inlet and outlet ports for bypassing input pressure fluid to thereby regulate the input flow through said directional control valve to one of said work ports.

2. A control valve as claimed in claim 1 wherein said directional control valve member is blocked from the pressure sensing port in the neutral position and communicating through a passageway in each chamber in each work position.

3. A control valve as claimed in claim 1 wherein the pressure compensating valve member is hollow and open at one end, said hollow portion communicating with the inlet port of both the directional control valve and the pressure compensating valve through openings in the sidewalls and discharging through its open end to the outlet port when the pressure in the chamber exceeds the biasing means and pressure sensing pressures.

4. A control valve as claimed in claim 1 wherein the pressure sensing port lies between and parallel to spaced parallel inlet chambers.

5. A control valve as claimed in claim 1 wherein the check valves are annular flat metal springs having an indexing finger engaging the spool to prevent rotation.

* * * * *